(12) United States Patent
Finch (10) Patent No.: US 11,893,360 B2
(45) Date of Patent: Feb. 6, 2024

(54) PROCESS FOR A FLOATING POINT DOT PRODUCT MULTIPLIER-ACCUMULATOR

(71) Applicant: Redpine Signals, Inc., San Jose, CA (US)

(72) Inventor: Dylan Finch, San Jose, CA (US)

(73) Assignee: Ceremorphic, Inc., San Jose, CA (US)

(*) Notice: Subject to any disclaimer, the term of this patent is extended or adjusted under 35 U.S.C. 154(b) by 308 days.

(21) Appl. No.: 17/180,856

(22) Filed: Feb. 21, 2021

(65) Prior Publication Data
US 2022/0269485 A1   Aug. 25, 2022

(51) Int. Cl.
G06F 7/544   (2006.01)
G06F 9/38    (2018.01)
G06F 7/499   (2006.01)
G06F 7/487   (2006.01)

(52) U.S. Cl.
CPC .......... *G06F 7/5443* (2013.01); *G06F 7/4876* (2013.01); *G06F 7/49936* (2013.01); *G06F 9/3893* (2013.01)

(58) Field of Classification Search
CPC .. G06F 7/5443; G06F 7/4876; G06F 7/49936; G06F 9/3893
See application file for complete search history.

(56) References Cited

U.S. PATENT DOCUMENTS

| 7,493,470 | B1 | 2/2009 | Cumplido et al. | |
| 8,626,813 | B1* | 1/2014 | Swartzlander | G06F 7/5443 |
| | | | | 708/501 |
| 2002/0089472 | A1 | 7/2002 | Tsai | |
| 2007/0061391 | A1 | 3/2007 | Tan et al. | |
| 2018/0336028 | A1 | 11/2018 | Takata et al. | |
| 2019/0196785 | A1 | 6/2019 | Danysh et al. | |
| 2019/0294415 | A1* | 9/2019 | Kaul | G06F 7/4876 |
| 2020/0401414 | A1 | 12/2020 | Ware et al. | |
| 2021/0263993 | A1* | 8/2021 | Urbanski | G06F 7/523 |
| 2021/0319079 | A1* | 10/2021 | Abdelaziz | G06F 17/16 |
| 2023/0053261 | A1* | 2/2023 | DiBrino | G06F 7/5443 |

FOREIGN PATENT DOCUMENTS

WO   2020191417 A2   9/2020

* cited by examiner

*Primary Examiner* — Matthew D Sandifer
(74) *Attorney, Agent, or Firm* — File-EE-Patents.com; Jay A. Chesavage (57) ABSTRACT

A process for performing vector dot products receives a row vector and a column vector as floating point numbers in a format of sign plus exponent bits plus mantissa bits. The process generates a single dot product value by separately processing the sign bits, exponent bits, and mantissa bits to form a sign bit, a normalized mantissa formed by multiplying pairs multiplicand elements, and exponent information including MAX_EXP and EXP_DIFF. A second pipeline stage receives the multiplied pairs of normalized mantissas, optionally performs an exponent adjustment, pads, complements and shifts the normalized mantissas, and the results are added in a series of stages until a single addition result remains, which is normalized using MAX_EXP to form the floating point output result.

19 Claims, 10 Drawing Sheets

*Figure 3A*
Unit Element MAC Process

Figure 3B
Adjust EXP_DIFF, MAX_EXP

Figure 3C
Unit Element MAC Process

PROCESS FOR A FLOATING POINT DOT PRODUCT MULTIPLIER-ACCUMULATOR

FIELD OF THE INVENTION

The present invention relates to a Multiplier-Accumulator for performing dot product computations between an input multiplicand matrix and a coefficient multiplicand matrix, forming a result from the sum of products.

BACKGROUND OF THE INVENTION

In machine learning applications, it is often desired to form dot product multiplications between a 1×n input row vector A and a n×m B coefficient matrix to generate a m×1 result R, such as:

$$[a_1 \ a_2 \ ... \ a_n] \cdot \begin{bmatrix} b_{11} & \cdots & b_{1m} \\ \vdots & \ddots & \vdots \\ b_{n1} & \cdots & b_{nm} \end{bmatrix} = R = \begin{bmatrix} a_1 b_{11} + a_2 b_{21} + ... + a_n b_{n1} \\ a_1 b_{12} + a b_{22} + ... + a_n b_{n2} \\ \vdots \\ a_1 b_{1m} + a_2 b_{2m} + ... + a_n b_{nm} \end{bmatrix}^T$$

One problem of prior art integer architectures is that the number of multiplication and addition operations scales as the product of n and m. For signed floating point multiplication operations, the complexity becomes much greater.

It is desired to provide a scalable high speed, low power multiply-accumulate (MAC) apparatus and method operative to form dot products from the addition of large numbers of floating point multiplicands.

OBJECTS OF THE INVENTION

A first object of the invention is a pipelined floating point multiplier having a sign processor, an exponent processor and a mantissa processor for performing multiply-accumulate operations on a linear array of N input floating point numbers with a linear array of N coefficient floating point numbers, each input floating point number and coefficient floating point number comprising a sign bit, an exponent comprising a plurality of exponent bits, and a mantissa comprising a plurality of exponent bits, the floating point multiplier comprising:

a plurality of pipeline stages, each pipeline stage comprising a first pipeline stage and a second pipeline stage;

the first pipeline stage having an exponent processor forming an exponent sum from the input exponent and coefficient exponent, and identifying a maximum exponent (MAX_EXP) and an exponent difference (EXP_DIFF) of MAX_EXP less the exponent sum, the sign processor forming a sign bit by exclusive ORing (XOR) the input floating point sign and coefficient floating point sign, each first stage also forming a normalized mantissa by an integer multiplication of an input floating point mantissa with a coefficient floating point mantissa;

each second pipeline stage coupled to a corresponding first pipeline stage, the second pipeline stage receiving a normalized mantissa from the corresponding first pipeline stage, the corresponding second pipeline stage having a mantissa Pad, Complement and Shift (PCS) stage which pads the normalized mantissa by prepending and appending 0s to the normalized mantissa, then performs a 2's complement operation on the padded mantissa when an accompanying sign bit from the first pipeline stage is asserted, and next shifts the padded or padded and 2's complemented mantissa according to an adjusted exponent difference (EXP_DIFF) to form an integer form fraction;

the plurality of second stage integer form fractions summed to form a single mantissa value, the single mantissa value combined with the MAX_EXP value and normalized to form a floating point output value.

A second object of the invention is a process for a unit element multiplier-accumulator (UE MAC) forming a floating point sum of products from a plurality N of floating point input values multiplied by a corresponding floating point coefficient, each floating point value and each coefficient value having a sign bit, a plurality of exponent bits, and a plurality of mantissa bits, the process comprising:

forming a plurality of N sums of input value exponents and corresponding coefficient exponent and selecting MAX_EXP as the largest sum from the plurality of N sums;

for each of the N input values and coefficient values:
separating a sign, mantissa, and exponent value;
forming a sign bit by exclusive ORing (XOR) an input value sign and a coefficient value sign;
forming a mantissa multiplication product by multiplying an input mantissa with hidden bit restored with a coefficient mantissa with hidden bit restored;
normalizing the mantissa multiplication by setting EXP_INC if the integer multiplication generates an overflow, and rounding to an integer value with a reduced number of bits than a number of bits resulting from the integer multiplication;
computing an exponent_sum value from an input exponent added to a coefficient exponent;
computing an exponent difference (EXP_DIFF) by subtracting the exponent sum value from MAX_EXP;
a processing stage with EXP_DIFF=0 incrementing MAX_EXP if EXP_DIFF is 0 and EXP_INC is set and sending a signal MAX_INC to other stages;
a processing stage which has EXP_DIFF greater than 0 incrementing EXP_DIFF if EXP_INC is not set and MAX_INC is set;
a processing stage which has EXP_DIFF greater than 0 decrementing EXP_DIFF if EXP_INC is set and MAX_INC is not set;
padding the normalized mantissa multiplication with leading 0s and trailing 0s;
replacing the padded normalized mantissa multiplication with a twos complement of the padded normalized mantissa multiplication if the sign bit is 1;
generating an output by shifting the padded normalized mantissa multiplication to the right by EXP_DIFF bits;
summing the outputs to form an integer form fraction;
generating a floating point result by normalizing the integer form fraction by extracting a floating point sign result from the integer form fraction, forming a floating point mantissa result by rounding the integer form fraction, and forming the floating point exponent result from MAX_EXP and leading 0s of the integer form fraction.

SUMMARY OF THE INVENTION

A unit element multiplier-accumulator for multiplying an input 1×n vector with an n×m coefficient matrix receives the 1×n input vector and n×1 column vector selected from the b coefficient matrix. Corresponding floating point elements of the 1×n vector and n×1 coefficient matrix are applied to n first stages, the first stage separating the sign bit, mantissa, and exponent for a corresponding input floating point component and coefficient floating point component. For example, if there are N=16 input/coefficient products, the architecture provides N=16 first stages, each concurrently performing first stage operations and passing results to a corresponding second stage. Each first stage includes a sign bit processor which performs an exclusive OR (XOR) operation on the pair of sign bits to determine a sign, a mantissa processor which performs a multiplication and normalization of the mantissa parts and also an exponent increment (EXP_INC) output indicating a mantissa overflow, and an exponent processor which sums corresponding input and coefficient exponent. A central maximum exponent finder examines all exponent sums to determine a maximum exponent (MAX_EXP) as well as a difference from MAX_EXP for the corresponding exponent sum. Each first stage thereby produces a sign bit, normalized multiplication result, exponent increment (EXP_INC) result from the mantissa multiplication, and from the plurality of first stages, a maximum exponent (MAX_EXP) value is found, and each first stage thereby computes a difference value (EXP_DIFF) from that stage's exponent sum to the MAX_EXP, which is passed to the corresponding second stage as a difference value EXP_DIFF.

The second pipeline stage thereby receives from each corresponding first pipeline stage the sign bit, the normalized multiplication result, EXP_INC value from the mantissa multiplication indicating a mantissa overflow, the MAX EXP value, and exponent difference EXP_DIFF. An adjustment stage which has EXP_DIFF=0 (indicating a largest exponent sum) and EXP_INC set causes MAX_EXP to increment by one and set a flag MAX_INC to other adjustment stages. Other adjustment stages which have EXP_DIFF>0 (second pipeline stages which do not have the largest exponent sum) and EXP_INC not set with MAX_INC set then increment EXP_DIFF, whereas adjustment stages with EXP_INC set and MAX_INC not set decrement EXP_DIFF. Adjustment stages with EXP_INC set and MAX_INC also set do not change EXP_DIFF, and adjustment stages with EXP_INC not set and MAX_INC set do not change EXP_DIFF. Each second pipeline stage takes the normalized mantissa multiplication result and modifies it in three steps, referred to as normalized mantissa Pad, Complement, Shift (Mantissa PCS). First, the normalized mantissa multiplication result from 208 is padded by pre-pended with 0s to accommodate the maximum value that may result from addition of N normalized values, and also appended with 0s for a desired precision by the addition of N stages. Next, if the sign input to the second pipeline stage is negative, the two's complement of the resulting value is substituted, otherwise the resulting value is unchanged. Lastly, the value is shifted to the right by the number bits of the exponent difference (EXP_DIFF) from the first stage, accommodating any exponent adjustments as may be necessary. The N pipeline stages, each generating an output from the mantissa Pad, Complement and Shift (PCS) stage thereby generate N integer form fractions, which are summed in pairs until a single integer value representing the sum of all integer form fractions remains. The summed integer form fraction is a signed value which is converted to an unsigned integer value (such as by 2's complement) with the sign extracted and used for the floating point result sign bit, and the summed integer form fraction is normalized to become the mantissa component, and MAX_EXP value is then used provide the exponent component, thereby forming a floating point result with sign bit, exponent, and mantissa that represents the sum of N products formed by each input and coefficient value.

DETAILED DESCRIPTION OF THE INVENTION

Figure 1A:
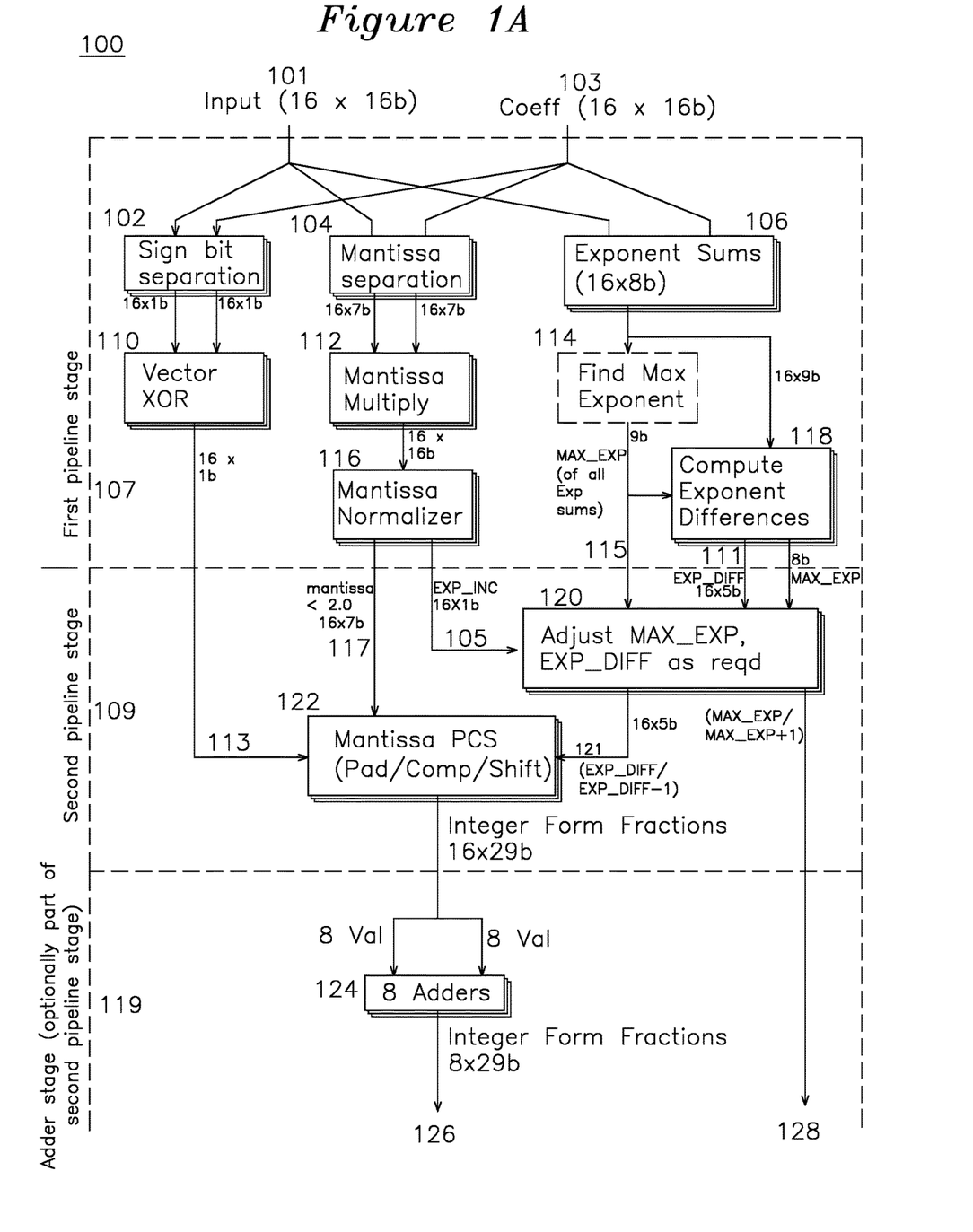
FIGS. 1A and 1B show a block diagram for a pipelined floating point multiplier according to a current example of the invention.

FIG. 1A shows a block diagram for an example Unit Element 100 of the present invention. The previously described dot product multiplication-accumulation is performed on individual columns of the B coefficient matrix, each multiplier-accumulator (MAC) multiplying and accumulating the A row (input) matrix by one of the B column (coefficient) matrices known and is known as a "unit element" performing a MAC function which generates a single sum of input/coefficient products in floating point format. In the present example the complete MAC comprises, m such unit elements, each of the m unit elements operating on a unique coefficient column k of the m coefficient columns as:

$$[a_1\ a_2\ \ldots\ a_n] \cdot \begin{bmatrix} b_{1k} \\ \vdots \\ b_{nk} \end{bmatrix} = [a_1 b_{1k} + a_2 b_{2k} + \ldots + a_n b_{nk}]$$

Figure 1B:
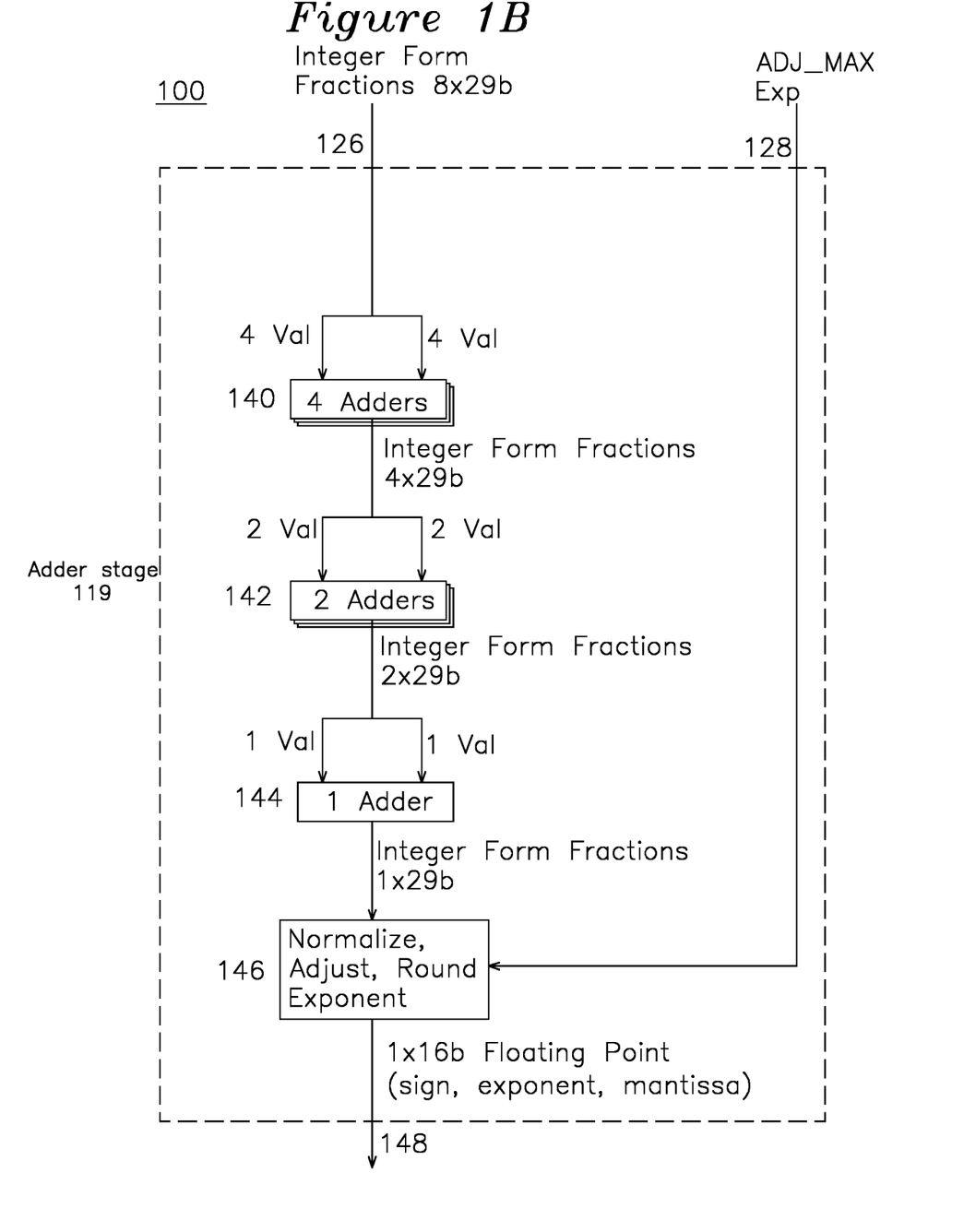

An input row vector 101 such as $[a_1\ a_2\ \ldots\ a_n]$ and one of the columns of the coefficient matrix 103

$$\begin{bmatrix} b_{1k} \\ \vdots \\ b_{nk} \end{bmatrix}$$

is input to the MAC 100 of FIGS. 1A and 1B, which comprises N simultaneously operating pipeline stages comprising first pipeline stage 107 coupled to a respective second pipeline stage 109 and an adder stage 119, which may be part of the second pipeline stage. The adder stage 119 may be performed separately since there are N second pipeline stages outputting results a binary tree of adders, for example 8 adders 124 feeding 4 adders 140 feeding 2 adders 142 and a final single adder 144. For this reason, the adder stage 119 is shown separate from the second pipeline stage, where each of the N pipeline stages contains identical processing blocks.

The first pipeline stage 107 separates the components (sign, exponent, and mantissa) from the pair of multiplicands (in the present example, one of the example sixteen input 101 terms and a corresponding coefficient 103 term), each term a floating point value comprising a sign bit, 8 exponent bits and 7 mantissa bits). Each of the N=16 input terms from 101 and corresponding 16 coefficient terms from 103 are provided to a separate one of the 16 pipeline stages 107/109, each input term and coefficient term separated into sign, exponent, and mantissa component for processing by the pipeline stages.

An example floating point value may be represented by:

$$-1^{S}*(1+b_n*2^{-1}+b_{n-1}*2^{-2}+\ldots +b_0*2^{-n})*2^E$$

where S is the sign bit, and [bn ... b0] is the mantissa (for n bits), and E is the exponent (as an unsigned integer, in the range 0-128 for the present example). It is important to note that the mantissa leading term 1 which precedes $b_n*2^{-1}$ in the above expression is known as a "hidden bit" in the representation of the floating point number, as it is implied by the floating point format but is not expressly present in the floating point format. Accordingly, the range of a mantissa of the above format is always in the range from 1.0 to less than 2.0. These floating point format examples and N=16 input/coefficient pairs for multiplication are set forth for understanding the invention, although the invention can be practiced with any number of exponent bits and any number of mantissa bits.

Each first pipeline stage 107 has a sign bit processor comprising 102 and 110, a mantissa processor comprising 104, 112, and 116, and an exponent processor comprising 106 and 118. The Find Max Exponent 114 function is shown in dashed lines as it is a separate module which receives exponent sums from all N exponent summers 106 and provides its output to all exponent processors 108. The sign bit processor of each of the N first pipeline stages 109 receives a corresponding pair of sign bits from a respective Input 101 and associated Coefficient 103 floating point term and performs an XOR 110 (noted as ⊕) of the sign bits to generate a sign bit 113, such that for each pair of sign bits, XOR 110 operates according to 0⊕0=0; 0⊕1=1; 1⊕0=1; 1⊕1=0 to generate the sign bit 113 associated with a multiplicand pair.

The first pipeline stage mantissa processor comprises mantissa separation 104, mantissa multiply 112, and mantissa normalize 116. The mantissa multiply 112 inputs a pair of 7 bit associated mantissa components from floating point input 101 and floating point coefficient 103, restores the "hidden bit" and generates a 16 bit integer mantissa multiply 112 result as an output. Multiplication of mantissas which represent a range from 1.0 to 1.99X, where X is specific to the floating point format. For example, the maximum value for a bfloat16 type is 1.9921875, the maximum value for a half precision type (FP16) is 1.9990234375, and the maximum value for a single precision type (FP32) is 1.9999998807907104, formats which are all described in the IEEE standard 754, "Standard for Floating Point Arithmetic". The multiplication of the two floating point values may generate a result as large as 3.99Y (Y indicating additional digits not shown), which requires a scaling by 2 to bring the multiplication result into the a range less than 2.0. Such an overflow from mantissa multiplication 112 results in the EXP_INC bit 105 being set by the mantissa normalizer 116. EXP_INC may result in a subsequent adjustment to the exponent difference (EXP_DIFF) or maximum exponent MAX_EXP, handled by the second pipeline exponent adjustment stage 120, which performs an adjustment where needed to MAX_EXP for a stage with the largest exponent sum and EXP_INC set, or alternatively, for other stages which have EXP_DIFF>0, increment or decrement EXP_DIFF based on EXP_INC and whether MAX_EXP was incremented by the stage with the largest MAX_EXP. Restoring the mantissa into a range from 1.0 to less than 2.0 is done by setting the adjust exponent (EXP_INC) bit which is fed to the second pipeline stage. In one example of the invention, the overflow result may be determined by checking to see if the most significant bit is set after performing the multiply, so for multiplication of two 8 bit values a[7:0]*b[7:0] generating a result c[15:0], an overflow occurred if the c[15] bit is set, resulting in the assertion of EXP_INC.

The first pipeline stage exponent processor comprises exponent summer 106 which computes the sum of the exponents extracted from the input 101 and coefficient 103 terms for each particular first pipeline stage 107 handling the respective one of the input and coefficient pairs, and operates with commonly shared find max exponent stage 114, which receives exponent sums 106 from all N first pipeline stages and outputs the largest exponent from the exponent sums, known as MAX_EXP 115. The compute exponent difference 118 block also returns a difference for the current exponent sum output by stage 106 compared to the MAX_EXP. The largest MAX_EXP will have an exponent difference (EXP_DIFF) value of 0.

In this manner, each of the N=16 first pipeline stages of FIG. 1A outputs a sign bit 113, normalized mantissa product 117, exponent adjust bit 105, MAX_EXP value 115, and an exponent difference EXP_DIFF 111, all of which are provided to the second pipeline stage 109.

The second pipeline stage 109 is operative to receive the corresponding first pipeline stage outputs and perform additional operations. Adjustment stage 120 increments MAX_EXP on a stage with EXP_DIFF=0 (indicating largest exponent) and sets a flag EXP_INC to the other stages with DIFF>0. The other stages with smaller exponent sums (with EXP_DIFF>0) receive the EXP_INC flag, and for those stages, the EXP_DIFF is incremented if EXP_INC is not set but MAX_INC is set, and alternatively, EXP_DIFF is decremented if EXP_INC is set but MAX_INC is not set. The mantissa Pad/Complement Shift (PCS) stage 122 receives the normalized mantissa value 117 from the first pipeline stage 116, and performs a first step of padding, whereby a fixed number of 0s is prepended and a fixed number of 0s is appended. Prepending leading 0s is done to maintain the range and precision of the summed result to prevent subsequent overflows during addition of the results from the N=16 second pipeline stages during adder stage 119. For the addition of N=16 integers, an optimal padding of four prepended leading 0s is sufficient to prevent an overflow error during the addition of the 16 normalized mantissas. For an example 29 bit integer form fraction, the normalized mantissa integer 117 having 8 bits may be padded with four 0 bits prepended (to accommodate 16 maximum non-overflow addition operations), and seventeen 0s may be appended to form a first integer form fraction of 29 bits. In general, the bit size after padding (shown as 29 in the present example) is a function of the multiplier output fraction width (8 bits in this example), the number of additions (16 in the present example, so the number of prepended padding bits is log base 2 of 16=4), and number of lower bits to preserve to maintain a desired accuracy during the mantissa additions. Alternatively, for a MAC summing 32 products, 16 bits wide, we have 5 ($\log_2$ 32)+8 (width of normalizer 116 output)+16 (bit precision of addition)=29 bits through the adders 124. The integer form fractions output by the Mantissa PCS stage 122 may range from 16 to 32 bits or an even wider range, depending on these parameters. Following the first step of padding, a second step of PCS 122 is to substitute a two's complement of the first integer form fraction if the sign bit 113 is negative, otherwise the first integer form fraction remains unmodified. A third step of PCS 122 is to perform a right shift by the number of positions indicated by adjusted exponent difference (EXP_DIFF) from adjustment stage 120, which uses the difference value 111 from the first pipeline stage and a binary exponent adjust value 105 from normalization, indicating that the multiplication 112 generated an increment in exponent.

The third step mantissa shift operation of 122 is governed by adjustment stage 120 which uses the adjusted EXP_DIFF 121 to determine how many bit positions the associated mantissa will shift according to the adjusted EXP_DIFF. Certain special cases are also considered by the adjustment 120. For the stage with the largest exponent sum, if EXP_INC from normalizer stage 116 is set indicating a mantissa multiplication overflow and EXP_DIFF is 0 (indicating this is the largest exponent), then MAX_EXP is incremented by 1 and the new value of MAX_INC is sent to the other stages, the increment of MAX_EXP shown as the value MAX_EXP+1. For stages other than the stage with the largest exponent sum (stages with EXP_DIFF>0), if EXP_INC from normalizer stage 116 is set and MAX_INC is not set, then EXP_DIFF 121 is decremented by one to acknowledge the change in exponent, whereas if EXP_INC from normalizer stage 116 is not set and MAX_INC is set, then EXP_DIFF is incremented. Other conditions of EXP_INC and MAX_INC do not cause a change in EXP_DIFF. The updated EXP_DIFF value is incorporated into the shift used in the third operation of the mantissa PCS stage 122.

The N output values from the Mantissa PCS 122 stage are summed in adder stage 119 as a binary tree of adders 124, 140, 142, and 144, resulting in a single integer form fraction value sent to output stage 146. If the integer form fraction input to 146 is negative, then a negative sign bit component is generated, and a 2s complement of the integer form fraction input to 146 is generated, along with a normalization step to round to the nearest mantissa number and truncated to the mantissa component output format, in the present example, 7 bits (without hidden "1." bit as previously described), and the exponent component is the MAX_EXP 128 output by adjustment stage 120 with 127 subtracted, as shown in the examples. If the integer form fraction input to output stage 146 is positive, the sign bit component is 0, the mantissa component is rounded and truncated to the number of bits required, and the exponent component is computed as before. The floating point output value is then the sign bit component, the exponent component, and the mantissa component such as 260 of FIG. 2A.

Figure 2A:
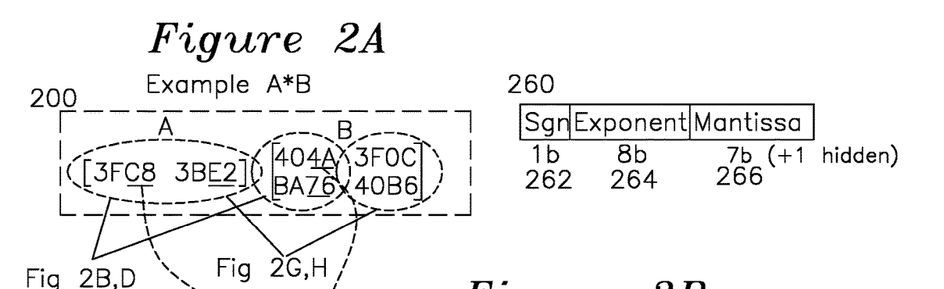
FIG. 2A shows an example multiplication for the first part of an example floating point format.
Figure 2B:
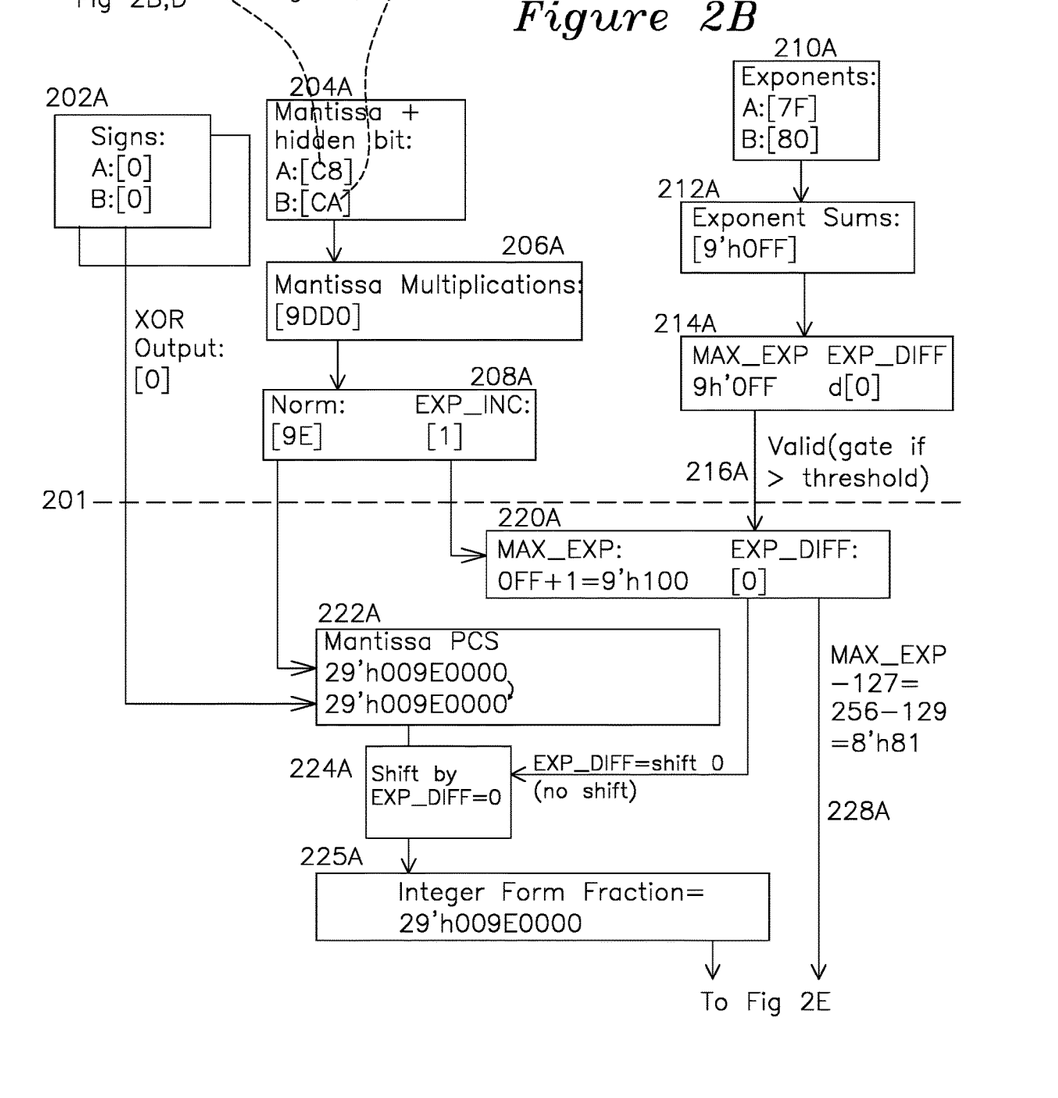
FIG. 2B shows an example computation of FIG. 2A for a 1×2 matrix with a 2×2 matrix.
Figure 2C:
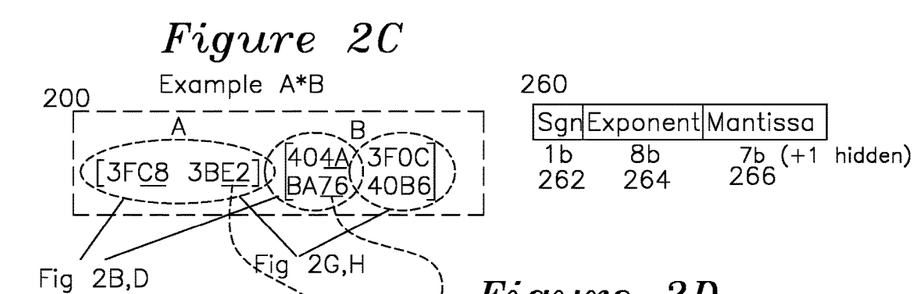
FIG. 2C shows an example multiplication for the second part of the example floating point format of FIG. 2A
Figure 2D:
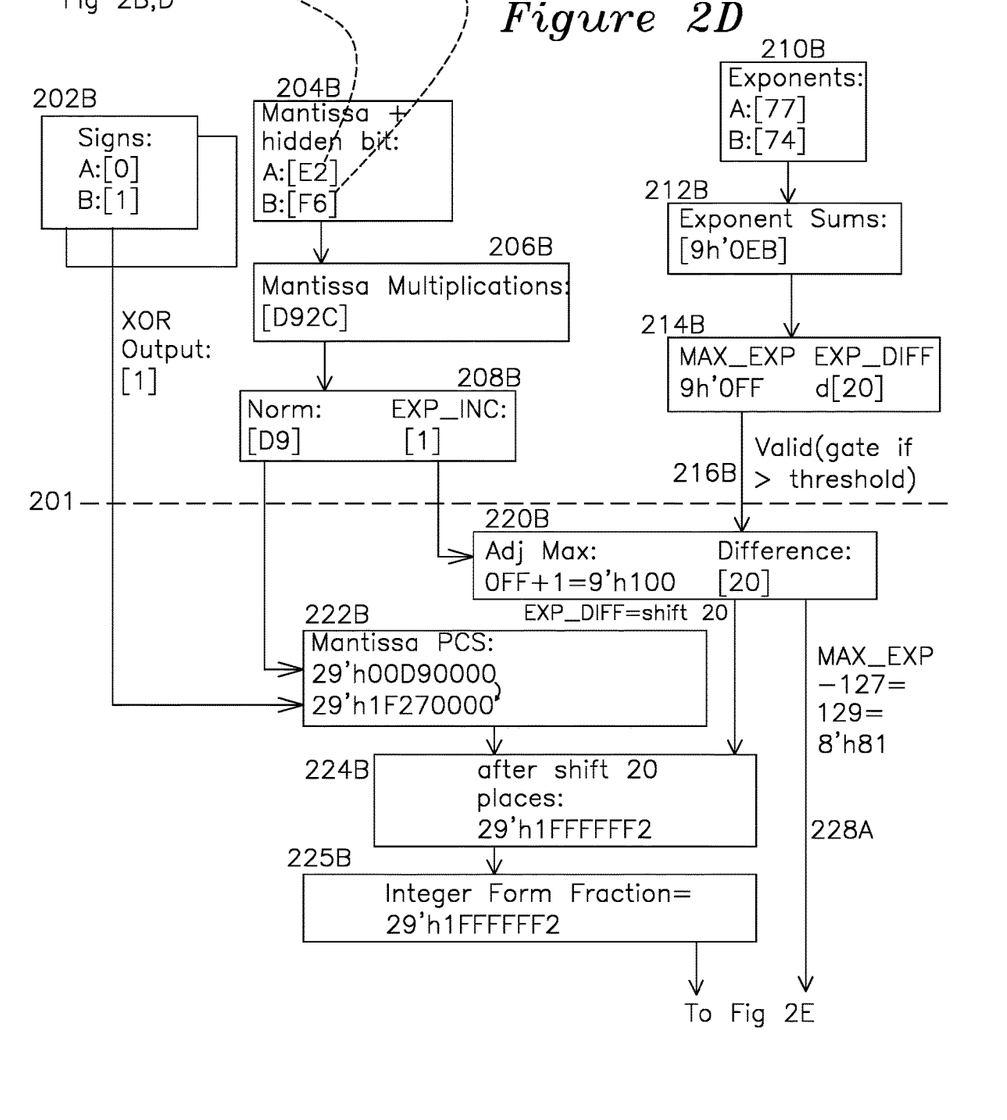
FIG. 2D shows an example multiplication for the second part of the example of FIG. 2C.
Figure 2E:
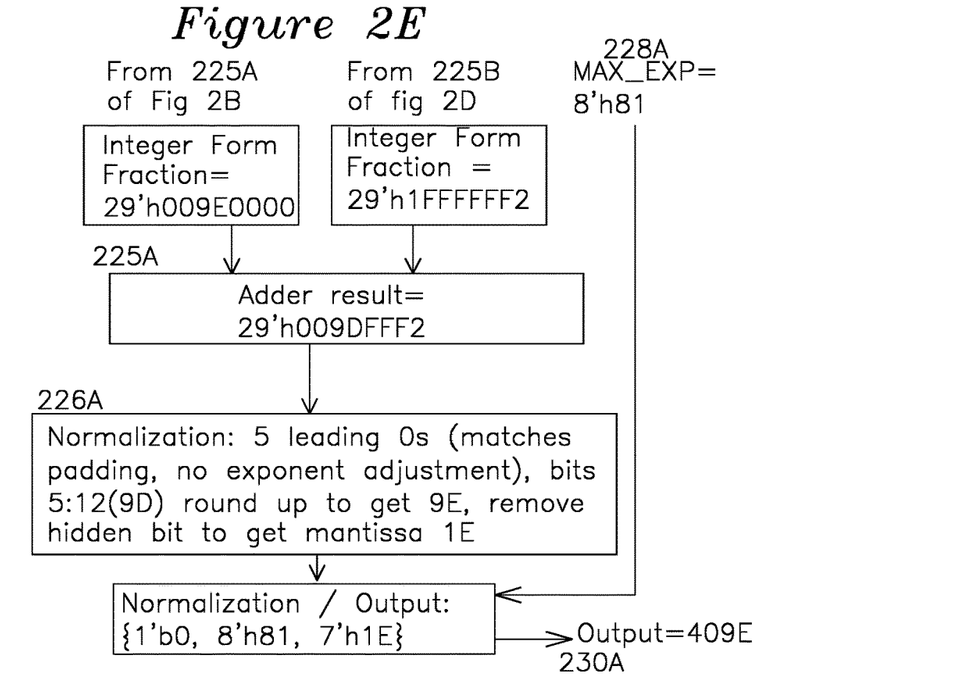
FIGS. 2E and 2F show example operations for the processing of FIGS. 2B and 2D.
Figure 2F:
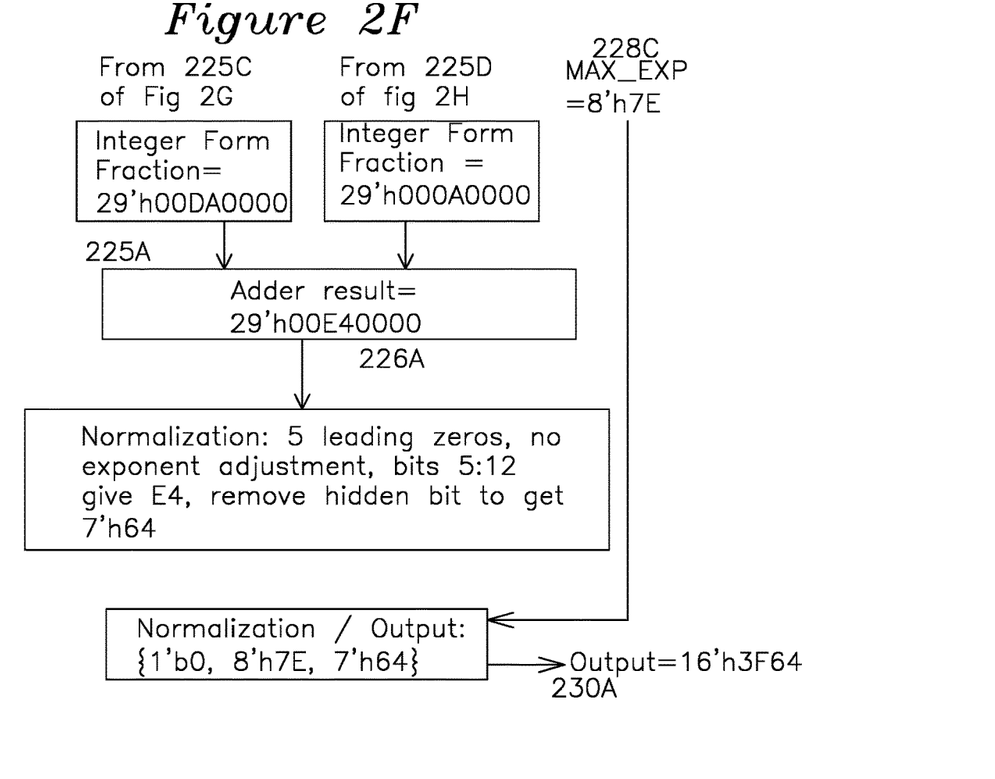

As a simple example, in place of the N=16 MAC previously described, for a detailed understanding of the invention, we may briefly consider the operation of a N=2 MAC 200 with the same functional stages shown in FIGS. 1A and 1B, comprising the first pipeline stage of FIG. 2B with operations to the second pipeline stage boundary 201, and adder stage shown in FIG. 2E, operating only on a first and second pair of input and coefficients shown in example coefficients of FIG. 2A (hexadecimal 3FC8 multiplied by hexadecimal 3BE2) shown in FIG. 2B, and hexadecimal 3BE2 multiplied by BA76 shown in FIGS. 2C and 2D, the two multiplication results summed and normalized to a final result in FIG. 2E.

FIG. 2A shows the simplified multiplication example of a 1×2 A matrix [a1a2] with a 2×2 B matrix $$\begin{bmatrix} b_{11} & b_{12} \\ b_{21} & b_{22} \end{bmatrix}$$

showing specific computational examples for further understanding of the invention. The example format of the values is 16 bit floating point format as shown 260, comprising a sign bit 262 followed by 7 bit mantissa 264 and 8 bit exponent 266. The resulting multiplication generates a 1×2 output result, each result is demonstrated in the examples shown in FIGS. 2B and 2D.

As a matter of notation convention, values are given as hexadecimal values by default, or by a prefix "N'R" where N indicates the number of bits present and R indicates the radix, where h=hexadecimal (also known as "hex") and d=decimal. N' is omitted for decimal numbers for values such as decimal 20 indicated simply as d20. For example 8'hFF and 9'h0FF indicate binary "1111 1111" and "0 1111 1111" respectively, and d(0,5) indicates the decimal values 0 and 5. Accordingly, 29'h1F270000 indicates a 29 bit register containing the hex value 1F270000. It should also be clarified that the examples of FIG. 2A, 2B, 2C, 2D, 2E, and 2F are selected for simplicity of understanding, and the padding of 29 bits as described in previous examples for the PCS 122 operation is selected to maintain the hex values after padding for clarity (a natural consequence of appending 16 bits of 0 rather than 17 bits which shifts by 1 bit).

We first clarify the floating point formats by decomposing the values used in FIGS. 2A and 2C, and adding the leading "hidden bit" to the mantissa, indicated as (1) provides the sign, exponent, and mantissa values as follows:
A1=3FC8 (0011 1111 1100 1000) becomes:
  0 0111 1111 (1)100 1000 or
  plus (sign=0), 8'h7F exponent, 8'hC8 mantissa.
B11=404A (0100 0000 0100 1010) becomes:
  0 1000 0000 (1)100 1010 or
  plus (sign=0), 8'h80 exponent, 8'hCA mantissa.
A2=3BE2 (0011 1011 1110 0010) becomes:
  0 0111 0111 (1)110 0010, or
  plus (sign=0), 8'h7E exponent, 8'hE2 mantissa.
B21=BA76 (1011 1010 0111 0110) becomes:
  1 0111 0100 (1)111 0110, or
  minus (sign=1), 8'h74 exponent, 8'hF6 mantissa.
B12=3F0C (0011 1111 0000 1100) becomes:
  0 0111 1110 (1)000 1100, or
  plus (sign=0), 8'h7E exponent, 8'h8C mantissa.
B22=40B6 (0100 0000 1011 0110) becomes:
  0 1000 0001 (1)011 0110
  plus (sign=0), 8'h81 exponent, 8'hB6 mantissa.

Figure 2G:
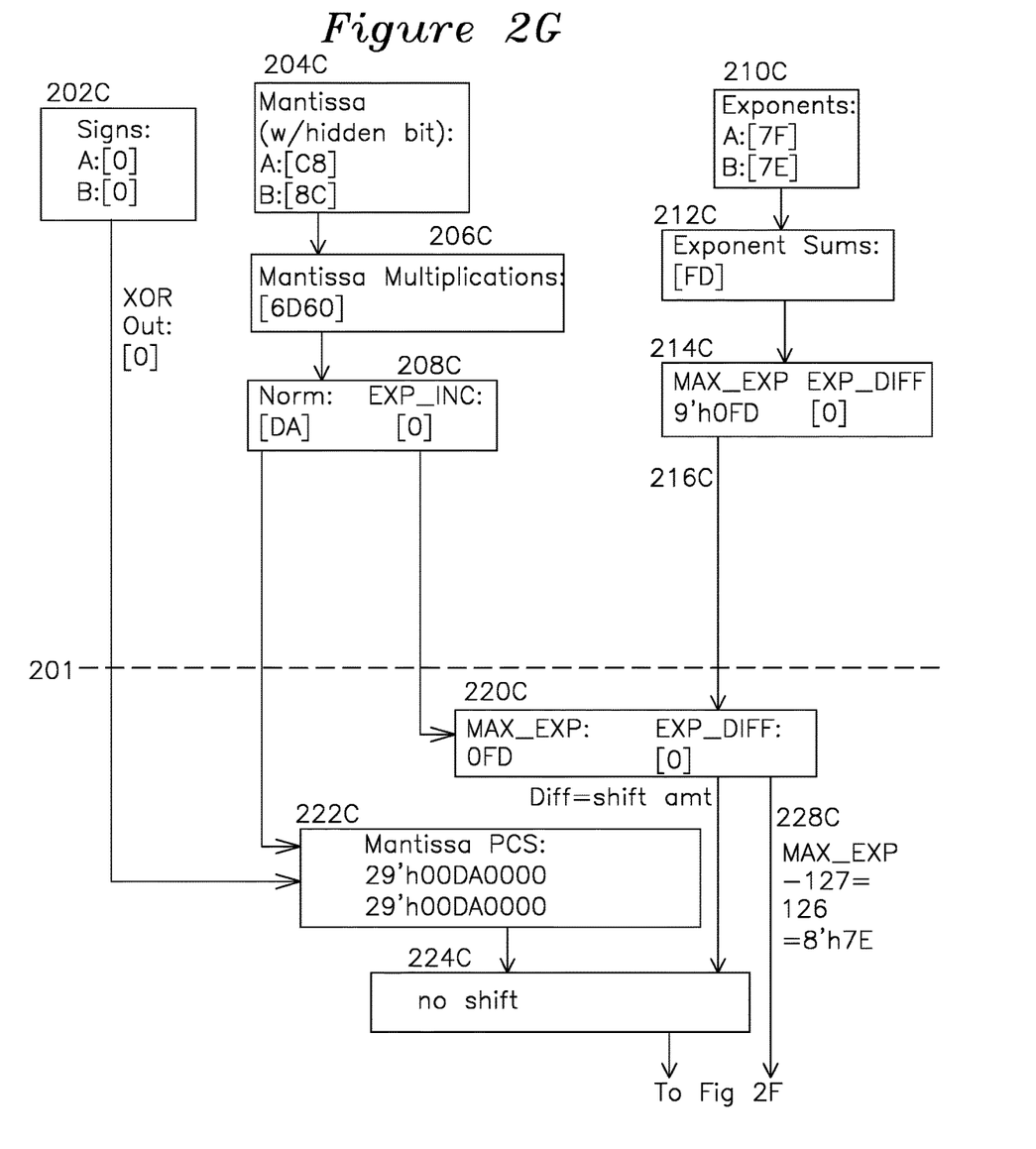
FIG. 2G shows the second example multiplication for FIG. 2A.
Figure 2H:
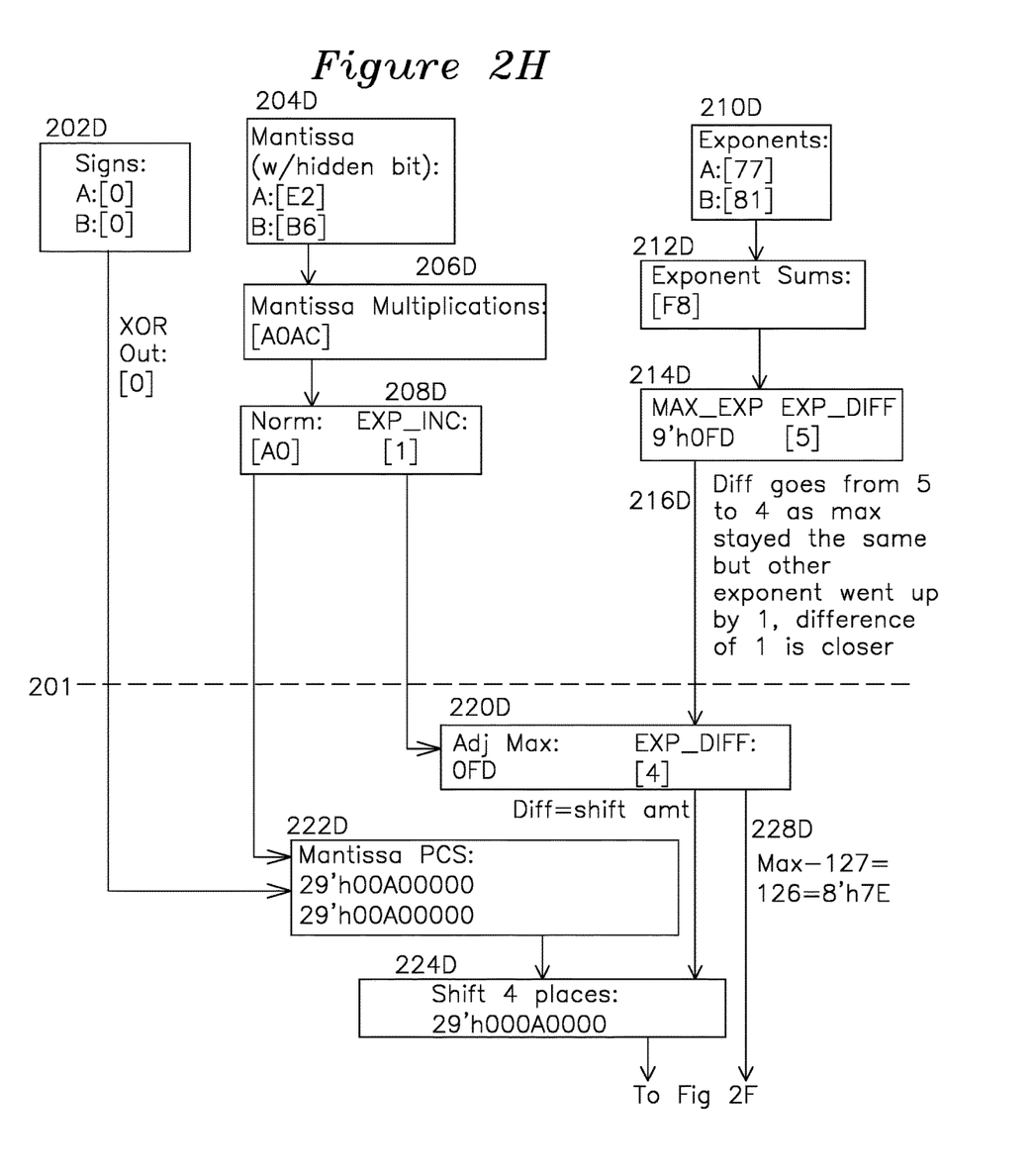
FIG. 2H shows the second example multiplication for FIG. 2A.

FIGS. 2B and 2D shows the computational steps of computing a1*b11 (shown in FIG. 2B) +a2*b21 (shown in FIG. 2D) and summed and normalized in FIG. 2E, according to the process and apparatus of FIGS. 1A and 1B. FIGS. 2G and 2H similarly show the computational steps of computing a1*b12 (shown in FIG. 2G)+a2*b22 (shown in FIG. 2H), which are summed and normalized in FIG. 2F.

In the first multiplication of A=3FC8 by B=404A shown in FIG. 2B, the sign processor 202A extracts sign bits for the A(0) and B(0) operands, and performs an exclusive or (XOR) operation of 0⊕0=0 generating the first pipeline stage sign bit 0.

In the second multiplication of A=3BE2 by B=BA76 shown in FIG. 2D, the sign processor 202B operates on sign bits A(0) and B(1), resulting in 0⊕1=1 and the sign bit from the first stage is 1 indicating a negative result.

In the first multiplication, the first stage mantissa processor comprises extraction stage 204A (corresponding to 104), mantissa multiply stage 206A (corresponding to 112) and mantissa normalize 204A (corresponding to 116). Extraction stage 204A extracts the mantissa plus hidden bit as C8 and CA, as was previously described previously in the floating point number decompositions. The integer multiplication of these two mantissa values generates the value 9DD0 and an overflow in step 206, which is rounded and normalized to 9E and in step 208A with exponent increment (EXP_INC) bit set to 1. These values are sent to a corresponding second pipeline stage as normalized mantissa product and EXP_INC, respectively.

In the second multiplication shown in FIG. 2D with B suffix related to the A suffix operations of FIG. 2B, fractional mantissas for A and B are separated and provided to 204B, which performs the multiplications, E2*F6=D92C shown in 206B. Step 208B shows a rounding and normalization to the most significant 8 bits of each mantissa multiplication from 206B, and D92C rounds and truncates to D9 shown in 208B.

The exponent processor is shown in FIG. 2B for the first term as exponent extraction steps 210A, exponent summer 212A generating the value 9'h0FF, and the second term exponent sum is shown in FIG. 2D as 9'h0EB. The maximum exponent finder 114 indicates 9'h0FF as the MAX_EXP, which is shown in FIG. 2B 214A and FIG. 2D 214B. Each exponent processor computes its exponent difference (EXP_DIFF), with 214A of FIG. 2B EXP_DIFF=d0 (since this exponent sum is the MAX_EXP) and 214B of FIG. 2D EXP_DIFF=d20. In this manner, the exponent processor of FIG. 2B sends a MAX_EXP value 9'h0FF and EXP_DIFF=0 to the second stage, and the exponent processor of FIG. 2D sends MAX_EXP 9'h0FF and EXP_DIFF=decimal 20 to the second stage.

The second pipeline stage operating on the first product and shown in FIG. 2B receives the sign bit, normalized mantissa, exponent increment, MAX_EXP, and EXP_DIFF values from the first stage. FIG. 2B shows exponent adjustment 220A receiving EXP_INC=1 and EXP_DIFF=0. Since 9'h0FF is already the maximum exponent and a mantissa overflow had occurred (now normalized), the maximum exponent value MAX_EXP is incremented from 9'h0FF to 9'h100, and EXP_DIFF remains 0. The Mantissa PCS first pads 8'h9E to 29'h009E0000, and next does not perform a 2's complement since the sign bit is positive, and next shifts the value by EXP_DIFF=0 bits, resulting in the integer form fraction 29'009E0000, which is output to adder stage in FIG. 2E.

The second pipeline stage operating on the second product and shown in FIG. 2D receives the sign bit, normalized mantissa, exponent increment, MAX_EXP, and EXP_DIFF values from the first stage. FIG. 2D shows exponent adjustment 220B receiving EXP_INC=1 and EXP_DIFF=d20. Since the present exponent sum 9'h0EB is not MAX_EXP, no action is taken on MAX_EXP as was performed in FIG. 2B, as only the stage with MAX_EXP and also EXP_INC performs this modification. The mantissa PCS 222 first performs padding of D9 to generate 29'00D90000, and since the sign bit is negative, the 2's complement of this value is taken, which generates 29'h1F270000, and this value is shifted by 20 decimal bits to the right (preserving sign) according to EXP_DIFF=20 from stage 220B, resulting in an integer form fraction output 29'h1FFFFFFF2 value, which is input to the adder of FIG. 2E.

The adder of FIG. 2E performs the addition of the two input values resulting in 29'h009DFFF2 225A. In this simplified example, only two values are added, whereas a typical MAC with N=16 performs the addition in pairs until a single value remains. Step 226A performs a normalization of the adder result, in this case, the 5 leading 0s match the 5 leading 0s of the padding of the PCS step 222A, so no exponent adjustment is necessary, a mantissa rounding is performed from 9DFFF2 to 9E, and the hidden bit is removed to generate mantissa 1E, the value is positive, so the sign bit is 0, and the exponent is MAX_EXP −127, or 8'h81, resulting in the output value 16'h409E.

FIGS. 2G and 2H show similar computations for the second column of the B matrix shown in FIGS. 2A and 2C. FIG. 2G for the first product shows Sign processor 202C generates sign bit 0, and the mantissa multiplication 206C generates 6D60, which becomes 8'hDA by adding the hidden bit, with an exponent increment of 0, and the exponent processor provides a maximum exponent sum of 9'hFD with difference (EXP_DIFF) of 0. FIG. 2H for the second product shows sign processor 202D generating a 0 bit, mantissa multiplication generating a normalized value A0 with an exponent increment=1 208D. The exponent sum for second product of FIG. 2H is 9'hF8, and MAX_EXP does not change, since the first product of FIG. 2G is greater. However, the EXP_INC of FIG. 2H means that a factor of 2 must be accounted for in the difference shift operation, and accordingly, EXP_DIFF is decremented from 5 to 4 to recognize the mantissa overflow and normalization. FIG. 2H Mantissa PCS performs the first step of padding normalized mantissa A0 to become 29'h00A00000, the second step 2's complement is not performed since the sign bit is 0, and the third step of shifting by EXP_DIFF=4 results in the value 29'h000A0000 224D. The integer form fractions of FIGS. 2G and 2H are input to the adder of FIG. 2F, resulting in the adder result 29'h00E40000, which is normalized to 7'h64. The adder result is positive, so the floating point sign is positive, and the MAX_EXP value is provided as the floating point exponent to generate the value 26'h3F64 as shown.

FIGS. 3A, 3B, 3C, and 3D show the operation of the unit element MAC as a process 300 for computing floating point accumulated value for a sum of products of floating point input I floating point coefficient C, such that $P=I_1C_1+I_nC_n+\ldots I_NC_N$. Step 302 computes a determination of MAX_EXP from the sum of exponent terms for each product term across the floating point exponent component of all N terms. Step 304 initiates a series of steps 306, 308, 310, 312, 314, 316, 318, and FIG. 3B steps of the adjustment stage compute any changes in MAX_EXP and EXP_DIFF, with FIG. 3C 340, 342, 344, 346, and 348 performed for each of the N product terms.

Step 306 is the separation of sign, mantissa, and exponent, as was previously described in FIG. 1A. Step 308 performs the sign bit process, performing an exclusive OR of the sign bits and returning a sign bit for later use in step 342. Step 310 restores the hidden mantissa bits prior to multiplication 312, and normalization 314, corresponding to 112 and 116 of FIG. 1A as previously described. The mantissa is normalized 314, which also generates the EXP_ADJ value previously described. The exponent sum 316 is computed for each result, or preferably is provided for each of the N product terms as part of step 302, which performed this step as part of determining MAX_EXP. The exponent difference (EX- P_DIFF) from MAX_EXP is computed in step 318, which leads to step 319 of FIG. 3B.

Figure 3A:
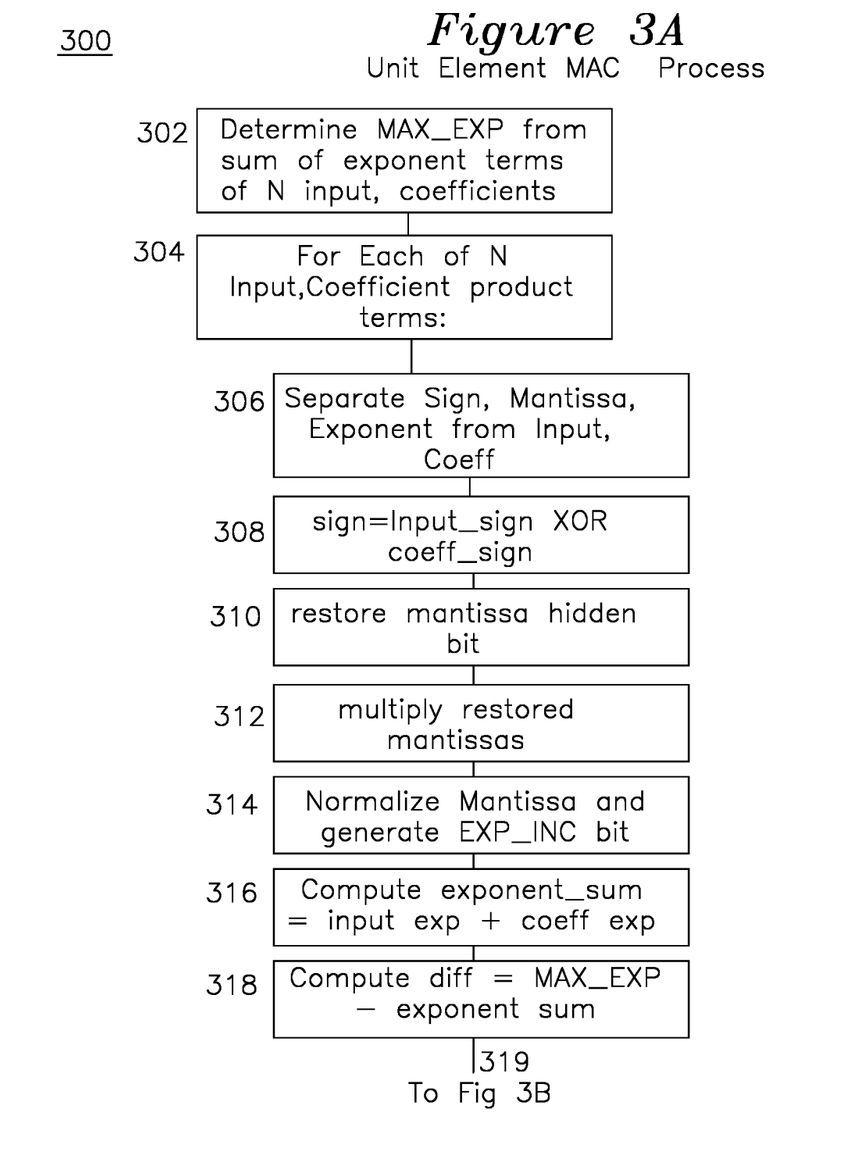
FIGS. 3A, 3B, 3C, and 3D show a flowchart for operation of the floating point multiplier-accumulator.
Figure 3B:
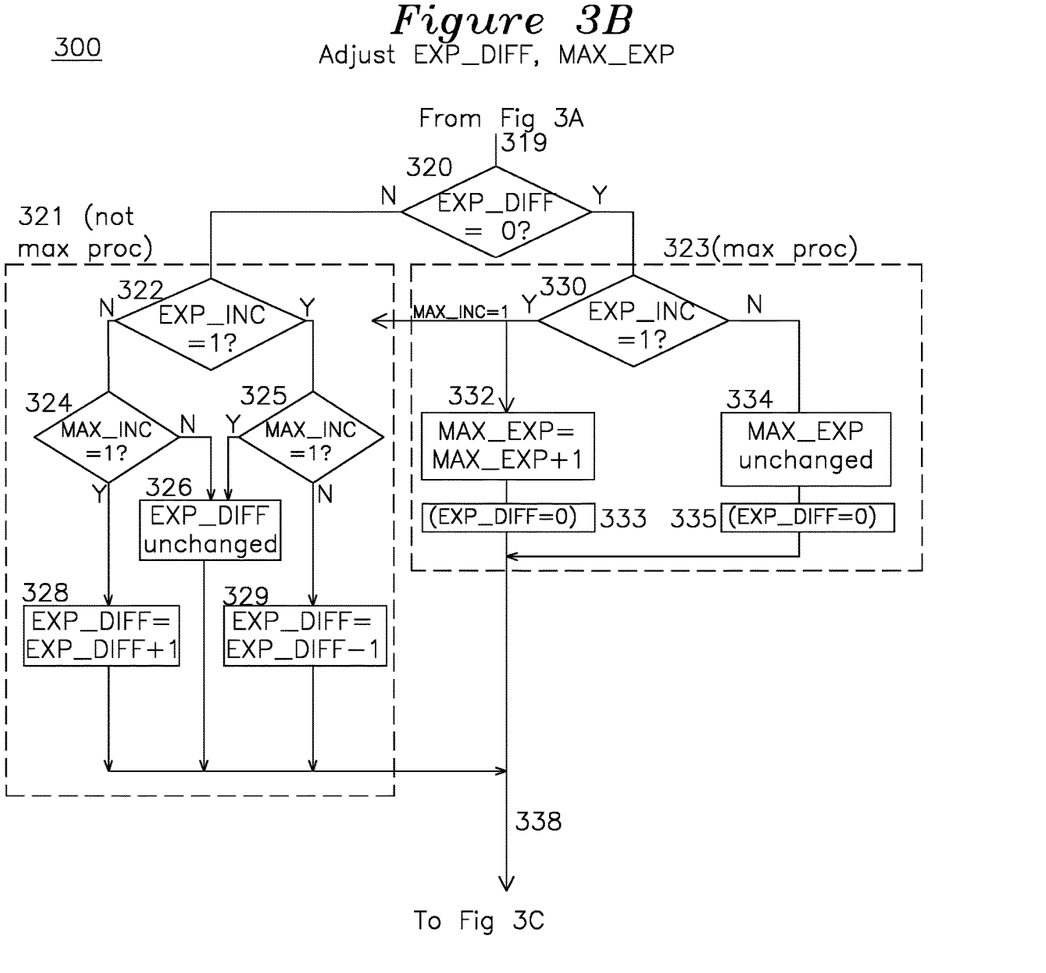

FIG. 3B shows the adjustment stage 120 for each of the N second pipeline stages of FIG. 1A. Step 320 EXP_DIFF=0 indicates adjustment steps 323 for a stage with the largest exponent sum, specifically incrementing MAX_EXP 332 if EXP_INC is set 330, which also causes a flag MAX_INC to be distributed to other stages. Where multiple stages satisfy the test EXP_DIFF=0 of 323 (multiple stages have the same maximum sum of input exponent and coefficient exponent), and multiple of these same stages have EXP_INC=1, MAX_EXP only increments once 332 and the value EXP_DIFF=0 remains unchanged (333, 335). Stages which do not have the MAX_EXP (indicated by EXP_DIFF>0 320), are processed as shown in 321, where the combination of EXP_INC=1 and MAX_INC not set 325 result in decrementing EXP_DIFF 329, and stages which have MAX_INC set with EXP_INC not set increment EXP_DIFF 328. Other combinations of EXP_INC and MAX_INC do not adjust EXP_DIFF 326.

Figure 3C:
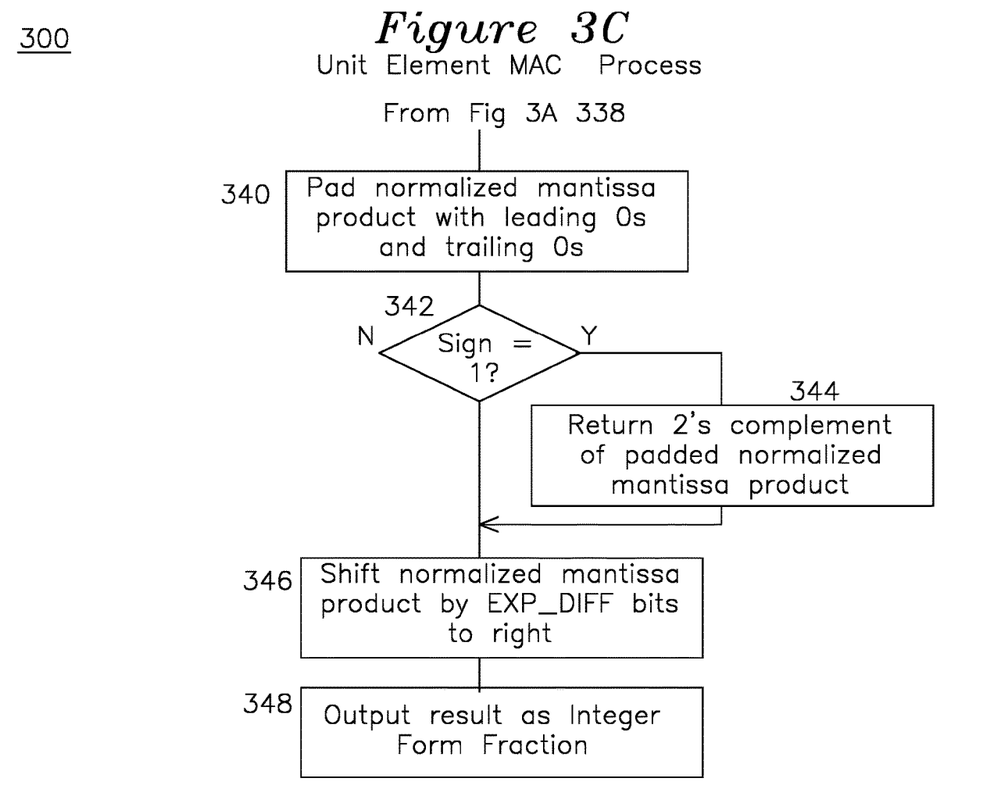

FIG. 3C shows a continuation of processing of FIG. 3B, showing the mantissa PCS steps of FIG. 1A 122, as padding 340, conditional ones complement 344 if the sign bit is negative 342 from step 308, shifting by EXP_DIFF in step 346, and the output of a single integer form fraction in step 348. Each of the N product terms generates the integer form fraction output 348.

Figure 3D:
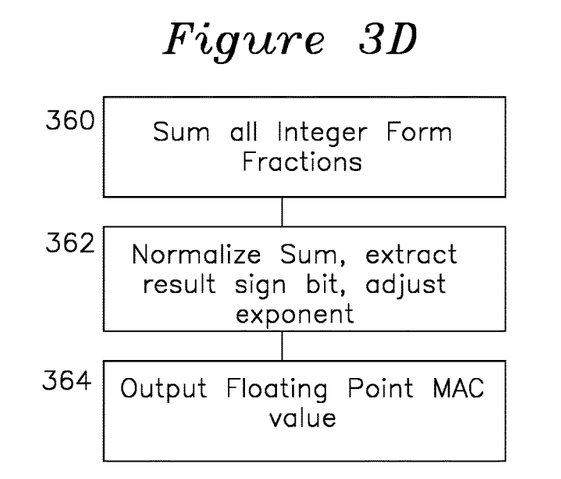

FIG. 3D shows the summing 346 of all product terms output in step 348, after which the sum is normalized to 8 bits, sign adjustments made (taking the two's complement and setting the sign bit to 1 if a negative sum results), and adjusting the exponent, as was described in step 146 of FIG. 1B.

FIGS. 1A and 1B describe an embodiment where an incoming N (shown for the case N=16) pairs of floating point values comprising a floating point input 101 and floating point coefficient 103 are processed simultaneously by N first pipeline stages, N second pipeline stages, and an adder stage 119 simultaneously sums N/2 integer form fractions in a first stage, N/4 integer form fractions in a second stage, and 2 integer form fractions in a final stage, performing the additions in a binary tree. Other variations of the invention are possible. For example, a single instance of first pipeline stage 107 and second pipeline stage 109 may be used in sequence with each coefficient pair, the output values being sent to an accumulating adder stage 119, which simply adds the new result to the previous one N for each of the N cycles until complete, with the normalization 146 occurring as before. However the order of operations is performed, MAX_EXP for the sum of exponents of the N pairs of floating point values must be determined prior to the sequential processing. In this case, a separate MAX_EXP processor which determines MAX_EXP may be used to scan the N pairs of exponents.

The present examples are provided for illustrative purposes only, and are not intended to limit the invention to only the embodiments shown. For example, the apparatus may be practiced as N pipeline stages operating concurrently, each pipeline stage forming an integer form fraction for use by a summing stage, with a first and second pipeline stage, so that each clock cycle generates a new MAC result. Alternatively, it is possible to scan the exponent sums to determine the MAC_EXP value, and thereafter to compute and sum each integer form fraction output from each Mantissa PCS stage separately, and accumulate each mantissa PCS output sequentially. The invention may be practiced as an apparatus or as a process without limitation to the examples provided merely for understanding the invention.

I claim:

1. A process for a pipelined floating point multiplier-accumulator (MAC) computing a floating point result from N floating point pairs, each floating point pair comprising a floating point input and a floating point coefficient, the process comprising:
  a maximum exponent controller determining a maximum exponent (MAX_EXP) value from among the N floating point pairs, the MAX_EXP value comprising a maximum sum value of an exponent of a floating point input and a corresponding exponent of a floating point coefficient;
  a dot product controller for each of the associated N floating point pairs performing a process of:
    generating a sign bit output from an exclusive OR (XOR) operation performed with an XOR gate on a sign bit of a corresponding floating point input and a sign bit of a corresponding floating point coefficient;
    generating a normalized mantissa by the dot product controller performing a multiplication of a mantissa of a corresponding floating point input with a mantissa of a corresponding floating point coefficient, and asserting an exponent increment (EXP_INC) bit when the multiplication generates a result with a most significant bit of 1;
    generating an exponent difference (EXP_DIFF) value by subtracting a sum of an exponent of the corresponding floating point input and an exponent of the corresponding floating point coefficient from MAX_EXP;
    when the EXP_DIFF value is 0 and the EXP_INC bit is asserted, incrementing MAX_EXP and asserting a maximum increment (MAX_INC) bit to other dot product controllers generating a respective normalized mantissa;
    when the EXP_DIFF value is not 0 and the EXP_INC bit is not asserted and the MAX_INC bit is asserted, incrementing the EXP_DIFF value;
    when the EXP_DIFF value is not 0 and the EXP_INC bit is asserted and the MAX INC bit is not asserted, decrementing the EXP_DIFF value;
    performing a padding step of pre-pended the normalized mantissa with at least one 0, performing a complement step of replacing a result of the padding step with a 2's complement of the result of the padding step if a corresponding sign bit output is 1, performing a shift step using a shift register which shifts the result of the complement step to the right by a number EXP_DIFF of bit positions and outputting a shifted result as an integer form fraction;
  accumulating N integer form fractions to generate an adder output;
  generating a floating point output by converting the adder output to a resulting sign bit and a resulting normalized mantissa derived from the adder output, thereafter outputting the resulting sign bit, an exponent derived from MAX_EXP, and the resulting normalized mantissa.

2. The process of claim 1 where at least one of the floating point inputs, the floating point coefficients, and the floating point output conforms to at least one of the formats: bfloat, FP16, and FP32 of an IEEE standard 754.

3. The process of claim 1 where the process is operative on multiple pipeline stages.

4. The process of claim 1 where the process is operative on a first pipeline stage and a second pipeline stage which has registered inputs receiving values from the first pipeline stage.

5. The process of claim 4 where the first pipeline stage and second pipeline stage operate in parallel on the N pairs simultaneously.

6. The process of claim 4 where the first pipeline stage and second pipeline stage operate sequentially on each of the N pairs.

7. A process for a pipelined floating point multiplier-accumulator (MAC) implemented with registers separating stages and configured to generate a sum of N products from a corresponding pair of values, each pair of values comprising a floating point input value and a corresponding floating point coefficient value, the process comprising:

each of the N products provided by a dot product controller performing a respective dot product process of:
outputting a sign bit computed from an exclusive OR (XOR) of a sign bit of a floating point input value with a sign bit of a corresponding floating point coefficient value;
computing an exponent sum of an exponent of the floating point input value with an exponent of the corresponding floating point coefficient, determining a maximum exponent (MAX_EXP) value from all N exponent sums, determining an exponent difference (EXP_DIFF) value between the MAX_EXP value and the corresponding exponent sum;
generating a product by multiplying a mantissa from the floating point input value with a mantissa from the corresponding floating point coefficient value and normalizing the product, and asserting an exponent increment (EXP_INC) bit if an overflow results from the multiplication;
when the EXP_DIFF value is 0 and the EXP_INC bit is asserted, incrementing MAX_EXP and asserting a maximum increment (MAX_INC) bit;
when the EXP_DIFF value is not 0 and the EXP_INC bit is not asserted and the MAX_INC bit is asserted, incrementing the EXP_DIFF value;
when the EXP_DIFF value is not 0 and the EXP_INC bit is asserted and the MAX_INC bit is not asserted, decrementing the EXP_DIFF value;
prepending and appending 0 values to the normalized product to generate a padded value, modifying the padded value by taking a two's complement of the padded value if the sign bit is 1, thereafter right shifting the result by the EXP_DIFF value to generate an integer form fraction;
a summing process receiving each of the N integer form fractions and outputting an integer form fraction sum;
converting the integer form fraction sum to a resulting sign bit and resulting normalized mantissa, and outputting a floating point output value comprising the resulting sign bit, an exponent derived from said MAX_EXP value, and the resulting normalized mantissa.

8. The process of claim 7 where a first pipeline stage outputs a sign bit, a normalized mantissa, the EXP_INC bit, MAX_EXP, and the EXP_DIFF value to a second pipeline stage having a registered input.

9. The process of claim 8 where the second pipeline stage generates N integer form fractions.

10. The process of claim 7 where each floating point input value comprises, in sequence, a sign bit, 8 bits of exponent, and 7 bits of mantissa.

11. The process of claim 7 where outputting an integer form fraction comprises N/2 add operations in parallel in a first stage, the N/2 add operations having a bit width equal to a number of bits of the integer form fraction sum.

12. The process of claim 7 where prepending 0 values comprises prepending at least $\log_2 N$ 0s.

13. The process of claim 7, where if more than one said EXP_DIFF value equals 0, the MAX_INC bit is asserted and MAX EXP is only incremented once.

14. The process of claim 7 where the MAX_INC bit from a process with the EXP_DIFF value equal to 0 is provided to processes where the EXP_DIFF value is not equal to 0.

15. The process of claim 7 where the integer form fraction has a bit width in a range of 16 to 32 bits.

16. The process of claim 7 where the floating point input values have a format conforming to IEEE standard 754.

17. A process for a pipelined floating point multiplier-accumulator (MAC) receiving N pairs of floating point values, each pair comprising a floating point input and a floating point coefficient, each floating point input and floating point coefficient comprising a sign bit, a plurality of mantissa bits, and a plurality of exponent bits, the process configured to operate on at least one pipeline stage register and comprising:

identifying for each of the N pairs of floating point values a maximum exponent sum (MAX_EXP) value among N sums of input exponent and coefficient exponent bits;
outputting for each of the N pairs of floating point values an exclusive OR bit value of a sign bit of an input value and a sign bit of a corresponding coefficient value to the at least one pipeline stage register;
for each of the N pairs of floating point values, forming an integer multiplication product of mantissa bits of a corresponding floating point input value and mantissa bits of a corresponding floating point coefficient value, the integer multiplication product rounded and normalized to a fewer number of bits, thereby forming a normalized multiplication result to the at least one pipeline stage register, and asserting the EXP_INC bit if the most significant bit of the integer multiplication product is 1;
for each of the N pairs of floating point values, generating an exponent difference (EXP_DIFF) value as a difference between the MAX_EXP value and the sum of an exponent of a floating point input value and an exponent of a corresponding floating point coefficient value;
when the EXP_DIFF value is 0 and the EXP_INC bit is asserted, incrementing MAX_EXP and asserting a maximum increment (MAX_INC) bit;
when the EXP_DIFF value is not 0 and the EXP_INC bit is not asserted and the MAX_INC bit is asserted, incrementing the EXP_DIFF value;
when the EXP_DIFF value is not 0 and the EXP_INC bit is asserted and the MAX_INC bit is not asserted, decrementing the EXP_DIFF value;
for each of the N pairs of floating point values, performing a padding step of padding the normalized multiplication result to a greater number of bits than a number of bits in the normalized multiplication result to form a padded value, performing a complement step of replacing the padded value with a 2s complement of the padded value if a respective sign bit for the associated pair of floating point values is 1, and performing a shift step of shifting a result of the complement step by a number EXP_DIFF of bit positions to generate an integer form fraction value;
computing a sum of N integer form fraction values;

generating a floating point result by determining a sign of the adder stage sum to generate a resulting sign part, normalizing the sum to generate a resulting mantissa part, and generating the floating point result from the resulting sign part, an exponent derived from the MAX_EXP value, and the resulting mantissa part.

18. The floating point MAC of claim 17 where the floating point values conform to at least one of: bfloat, FP16, or FP32 of IEEE standard 754.

19. The floating point MAC of claim 17 where the floating point result conforms to at least one of: bfloat, FP16, of FP32 of IEEE standard 754.

* * * * *